(12) United States Patent
Corey et al.

(10) Patent No.: US 11,190,338 B1
(45) Date of Patent: Nov. 30, 2021

(54) SELECTIVE VIEWABILITY OF DATA IN A BLOCKCHAIN

(71) Applicant: Facebook, Inc., Menlo Park, CA (US)

(72) Inventors: Michael Randolph Corey, New York, NY (US); Daniel K. Chapsky, Brooklyn, NY (US); Erik Taubeneck, Brooklyn, NY (US); Ionela-Roxana Danila, New York, NY (US); Yu-Yu Lin, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 564 days.

(21) Appl. No.: 16/012,687

(22) Filed: Jun. 19, 2018

(51) Int. Cl.
*H04L 9/32* (2006.01)
*H04L 9/06* (2006.01)

(52) U.S. Cl.
CPC .................. *H04L 9/0618* (2013.01)

(58) Field of Classification Search
CPC ................. H04L 9/0618; G06F 2207/4814
See application file for complete search history.

(56) References Cited

U.S. PATENT DOCUMENTS

| | | | | |
|---|---|---|---|---|
| 6,785,786 B1* | 8/2004 | Gold | .................. | G06F 11/1469 711/162 |
| 10,554,649 B1* | 2/2020 | Fields | .................. | H04L 9/3263 |
| 10,621,164 B1* | 4/2020 | Kain | .................. | G06F 16/244 |
| 2017/0155515 A1* | 6/2017 | Androulaki | ............. | H04L 9/008 |
| 2017/0228317 A1* | 8/2017 | Drapala | ............... | G06F 12/0817 |
| 2017/0228371 A1* | 8/2017 | Seger, II | ............. | G06F 16/2379 |
| 2018/0349621 A1* | 12/2018 | Schvey | ................ | H04L 9/0643 |
| 2019/0050831 A1* | 2/2019 | Kikinis | ................ | G06Q 20/389 |
| 2019/0123889 A1* | 4/2019 | Schmidt-Karaca | ... | H04L 9/3239 |
| 2019/0130190 A1* | 5/2019 | Raspotnik, Jr. | ......... | G06F 21/53 |
| 2019/0158594 A1* | 5/2019 | Shadmon | ............. | H04L 9/0819 |

* cited by examiner

*Primary Examiner* — Phy Ahn T Vu
(74) *Attorney, Agent, or Firm* — Fenwick & West LLP

(57) ABSTRACT

An online system receives impression data from one or more content publishers. The impression data describes impressions provided to users of the online system on behalf of an agent. The online system selects a randomly selected number of impressions in the received impression data. The online system generates an impressions block by encrypting impression data that describes the selected set of impressions using a unique cypher, and adds the impressions block to a blockchain. The online system further generates a cypher block by encrypting the cypher and an identifier of the impressions block to which the cypher applies using a public key provided by the agent to the online system. The online system adds the cypher block to the blockchain. The agent can recover the cypher from the cypher block based on a private key, and the agent can then recover the impression data using the recovered cypher.

18 Claims, 4 Drawing Sheets

SELECTIVE VIEWABILITY OF DATA IN A BLOCKCHAIN

BACKGROUND

This disclosure relates generally to a blockchain used to publish blocks of encrypted impression data in which each block is selectively viewable to one or more authorized recipients of the blockchain.

Online content publishing systems provide data reports to content providers over computer networks describing impressions served by the online content publishing system on behalf of the content provider. If an online content publishing system serves content on behalf of multiple content providers, the online content publishing system provides similar data reports to each of the content providers. The online content publishing system may also provide data reports to third parties that perform analysis on the data, e.g., on behalf of some subset of the content providers. To provide reports to the various recipients, the online content publishing system may filter the correct data for each recipient, and securely transmit the data reports to each content provider and third party. This can involve producing and transmitting the same data multiple times, possibly using different transmission methods or security protocols. In addition, the data recipients must trust that, if they receive a past data report, the underlying data has not been changed at the online content publishing system.

Blockchain technology, also referred to as distributed ledger technology (DLT), is a network system which allows multiple participants to maintain an immutable collection of transactions with mathematical guarantees of consensus across the network. Blockchain technologies have been applied to cryptocurrencies, file storage, supply chain management, and other applications.

SUMMARY

An online system collects and publishes impression level data on a blockchain in which data is selectively viewable. The blockchain includes blocks of encrypted data describing impressions, referred to as impressions blocks, and blocks that provide cyphers for accessing the encrypted impression data, referred to as cypher blocks. Each impressions block is individually encrypted with a unique cypher, and each unique cypher decrypts a single impressions block. The cypher blocks, which provide the unique cyphers for decrypting the impressions blocks, are encrypted using a public key of an intended recipient. Thus, the intended recipient of a given impressions block decrypts a cypher block that was encrypted using the intended recipient's key, and then the intended recipient uses the recovered cypher to decrypt the impressions block. A second intended recipient can gain access to the same impressions block by decrypting a second cypher block that is encrypted by the second recipient's public key. Each participant of the blockchain can decrypt and view the data in impressions blocks for which it can decrypt corresponding cypher blocks, and each participant is unable to decrypt and view data in impressions blocks if it cannot decrypt any corresponding cypher blocks. Impressions blocks on the blockchain can be made viewable to a participant at any time, including a time in the future, by adding a cypher block encrypted with that participant's public key that allows the participant to decrypt the impressions block and view the decrypted data. In addition to multiple participants accessing the blockchain, in some embodiments, multiple participants can add blocks to the blockchain. For example, multiple providers of impression level data can add impressions blocks and corresponding cypher blocks to the blockchain.

In some embodiments, an online system receives impression data from one or more content publishers, such as website publishers. The impression data describes impressions provided to users of the online system on behalf of an agent, such as a content source. In this example, a content source may have provided content items to the online system, which in turn has arranged with content publishers to publish the content items to users of the online system. The online system itself may also be a content publisher. The online system, having received the impression data, selects a set of impressions from the impression data. The selected set of impressions is a randomly selected number of impressions in the received impression data. The online system generates an impressions block by encrypting impression data that describes the selected set of impressions using a unique cypher, and adds the impressions block to a blockchain. The online system further generates a cypher block by encrypting the cypher and an identifier of the impressions block to which the cypher applies using a public key provided by the agent to the online system. The online system adds the cypher block to the blockchain. The agent can recover the cypher from the cypher block based on a private key corresponding to its public key, and the agent can then recover the impression data describing the selected set of impressions using the recovered cypher.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
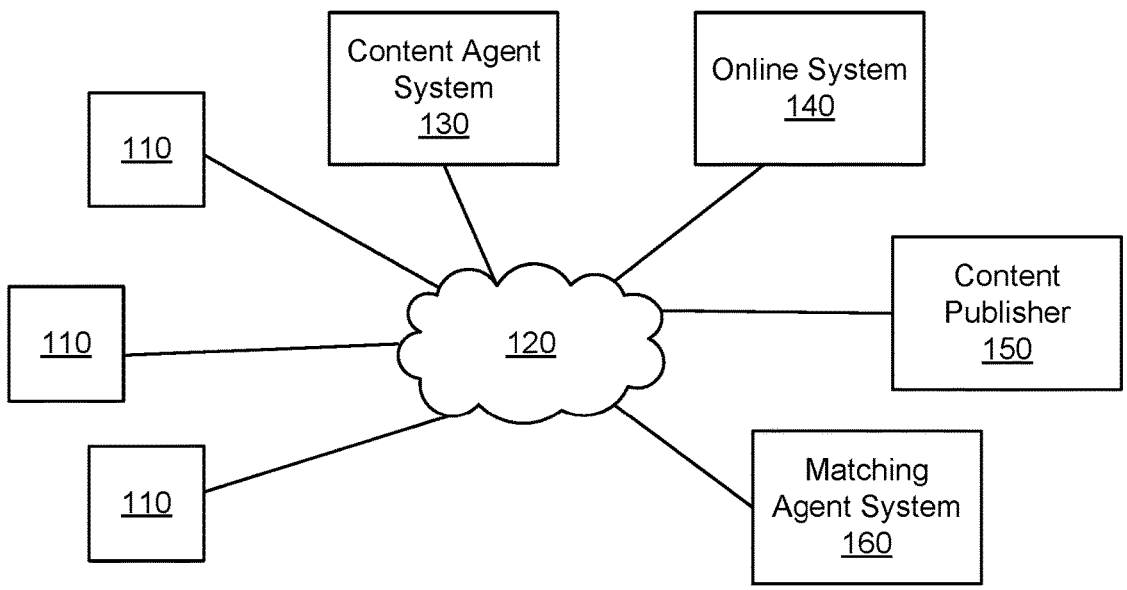
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more content agent systems 130, the online system 140, one or more content publishers 150, and one or more matching agent systems 160. In alternative configurations, different and/or additional components may be included in the system environment 100. For example, in various configurations the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more content agent systems 130 may be coupled to the network 120 for communicating with the online system 140, which is further described below in conjunction with FIG. 2. In one embodiment, a content agent system 130 provides content items for presentation via a client device 110. A content agent system 130 may communicate content items to the online system 140, such as advertisements or informational content, for the online system 140 to disseminate to the client devices 110. A single instance of a content item being served (e.g., provided or "published") to a client device 110 is referred to herein as an impression. In some embodiments, an impression is only counted (i.e., recordable impression information is generated) when the content item is fully displayed, displayed above a threshold amount (e.g., at least 80% of the surface area of an image, or at least 50% of the duration of a video), displayed for at least a threshold amount of time (e.g., one second), when a user engages with the content item, when a user initiates a purchase in response to the content item, or based on one or more other conditions or a combination of conditions. Impression level data, also referred to as impression data, is data that describes individual impressions. In some embodiments, an impression is generated when content is transmitted, and impression level data includes data describing the extent of the content that is presented (e.g., in terms of display area or time), user interaction with the content, etc. Impression level data may include an identification of a recipient of an impression (e.g., a client device 110 or a user of the client device 110), a time or approximate time of the impression, and an identification of the content.

The online system 140 provides impressions of content provided by the content agent system 130 to client devices 110. The online system 140 may directly provide the content to client devices 110, e.g., through an app or website provided by the online system 140. In addition, the online system 140 may arrange with one or more additional content publishers 150 to provide the content to client devices 110. For example, the online system 140 may provide advertisements to another content publisher 150 (e.g., a website or app provider), which displays the advertisements to client devices 110 that access a webpage or application of the content publisher 150.

The content agent system 130 accesses a blockchain on which is published impression level data describing the impressions served by the online system 140 or additional content publishers 150. One content agent system 130 is able to view the impression level data for impressions of its own content (e.g., after decrypting the impression level data), but that content agent system 130 may be unable to view impression level data for impressions of another agent system's content (e.g., because the content agent system 130 cannot decrypt the impression level data).

One or more matching agent systems 160 are also coupled to the network 120 for communicating with the online system. A matching agent system 160 is a system that can match impressions for content provided by multiple content publishers 150 to the same user, and perform analyses on the impressions provided to the users by multiple publishers 150. In an embodiment, a matching agent system 160 is granted access by one or more content agents to perform analysis on behalf of the content agent. In another embodiment, the matching agent system 160 contracts with a content agent to gain access to data also provided to the content agent, so that the matching agent system 160 can learn about users for other purposes. To obtain the impression data, the matching agent system 160 accesses the same blockchain describing the impressions that the content agent systems 130 access. The matching agent system 160 retrieves impression level data describing content provided by multiple content publishers 150 (or the online system 140), and matches impressions (e.g., across multiple blocks added to the blockchain) to a single client device 110 or user of a client device 110, based on data identifying the client device or user available to the matching agent system 160. The matching agent system 160 may perform cross-publisher analysis based on the impression level data.

Figure 2:
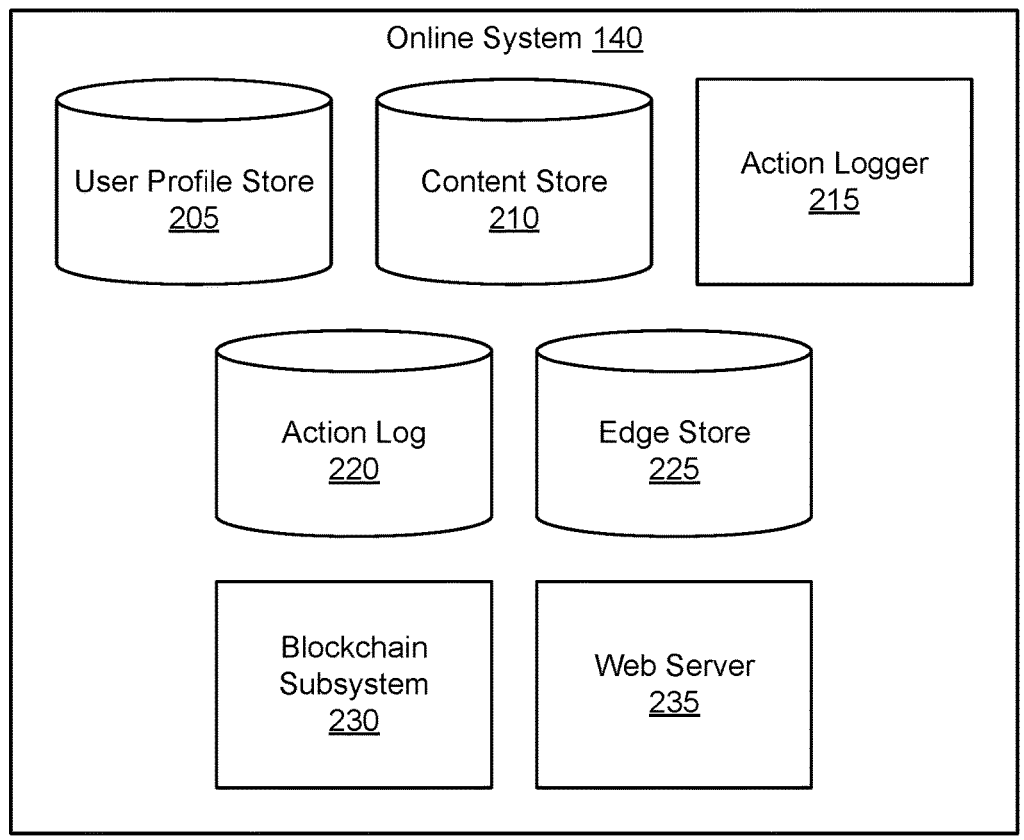
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a blockchain subsystem 230, and a web server 235. In other embodiments, the online system 140 may include additional, fewer, or different components for various applications. Additional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 in exchange for an impression of the content item. For example, the bid amount included in a content item specifies a monetary amount that the online system 140 receives from a content agent system 130 that provided the content item to the online system 140 if a client device 110 receives an impression of that content item. In some embodiments, the expected value to the online system 140 of presenting the content from the content item may be determined by multiplying the bid amount by a probability of the content of the content item being accessed (e.g., clicked) by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item. In some embodiments, impression level data comprises data describing any of these objectives.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a content agent system 130. For example, targeting criteria identifies users that have taken a particular action, such as sent a message to another user, used an application, joined a group, left a group, joined an event, generated an event description, purchased or reviewed a product or service using an online marketplace, requested information from a content agent system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 120 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on content agent systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a content agent system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a content agent system 130, including webpage viewing histories, advertisements that were engaged, purchases made, and other patterns from shopping and buying. Additionally, actions a user performs via an application associated with a content agent system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The blockchain subsystem 230 receives data reflecting activities of participating publishers, such as the online system 140, and adds or "publishes" such data to a blockchain. In particular, the blockchain subsystem 230 collects impression data, forms sets of impression data into impressions blocks, and adds the impressions blocks to a blockchain. The blockchain subsystem 230 also publishes cypher blocks that other participants in the blockchain can access to recover the impression data. The blockchain subsystem 230 may store a copy of the blockchain. The blockchain may also include blocks published by one or more additional parties. The blockchain subsystem 230 is described in greater detail with respect to FIG. 3.

The web server 235 links the online system 140 via the network 120 to the one or more client devices 110, as well as to the one or more content agent system 130 and matching agent systems 150. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Creating a Blockchain with Selectively Viewable Impression Data

Figures 3, 4, 5:
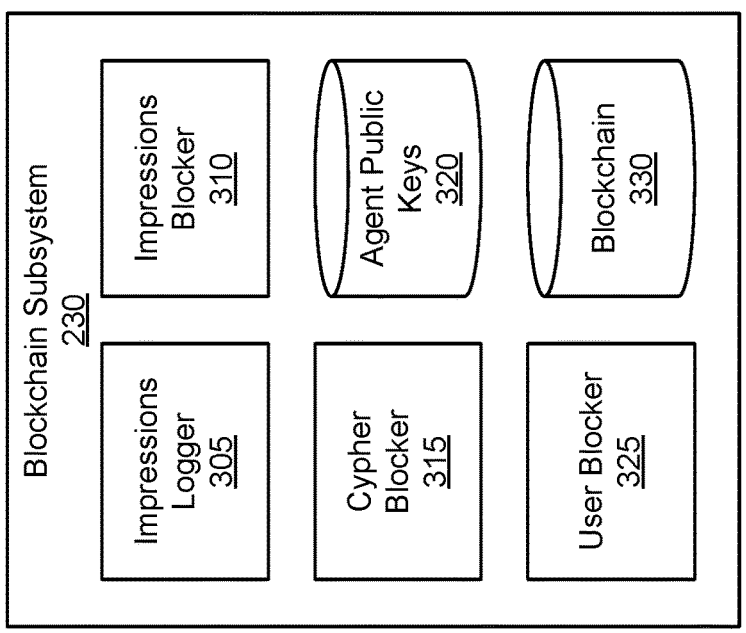
FIG. 3 is a block diagram of a blockchain subsystem of the online system, in accordance with an embodiment.
FIG. 4 is an example of an impressions log segment, in accordance with an embodiment.
FIG. 5 is an example set of impressions block data, in accordance with an embodiment.

FIG. 3 is a block diagram of the blockchain subsystem 230 of the online system 140, in accordance with an embodiment. The blockchain subsystem 230 includes an impressions logger 305, an impressions blocker 310, a cypher blocker 315, a data store of agent public keys 320, a user blocker 325, and a copy of a blockchain 330. In other embodiments, the blockchain subsystem 230 includes fewer, additional, or alternative elements to those shown in FIG. 3. In some embodiments, each content publisher 150 includes a blockchain subsystem similar to the blockchain subsystem 230 shown in FIG. 3.

The impressions logger 305 receives data describing impressions provided by the online system 140 or another content publisher 150 on behalf of a content agent system 130. The impressions logger 305 logs this received data in an impressions log. The impressions logger 305 logs, for each impression, an identifier of the user or client device 110 to which the impression was delivered and a time that the impression was served. The impressions logger 305 also logs, for each impression, data identifying the content that was provided and/or the content agent system 130 that provided the content. If a content item is part of a campaign in which one or multiple content items are targeted to specific types or groups of users, the impressions logger 305 may identify and log data identifying the campaign that the impression is associated with. The impressions logger 305 may log any other data related to an impression, such as data identifying the publisher of the impression (e.g., the online system 140 or one of the content publishers 150), user actions taken with respect to content in an impression (e.g., mouse over the content, click the content, close the content, initiate a purchase, etc.), the amount of the content that was displayed in the impression (e.g., 80% of the surface area of an image), a duration for which the impression was displayed, etc. The impressions logger 305 may produce different impressions logs for different content publishers 150, e.g., one or more logs for impressions provided by the online system 140, and one or more logs for impressions provided by each content publisher 150. Alternatively, each content publisher 150 may generate its own impressions log, which it can provide to the online system 140 or add to the blockchain using its blockchain subsystem similar to the blockchain subsystem 230. The impressions logger 305 may also produce different impressions logs for different content providers, e.g., one or more logs for impressions provided on behalf of each content agent system 130.

The impressions blocker 310 collects segments of the impressions log and generates a block of impressions data based on the segment. FIG. 4 is an example of a segment 400 of the impressions log produced by the impressions logger 305 and collected by the impressions blocker 310. The impressions log segment 400 includes, for each impression, a user identifier (ID) 410, a campaign identifier 420, and a timestamp 430. For example, the first impression in the impressions log segment 400 has user ID 410a, campaign ID 420a, and timestamp 430a. As discussed above, the impressions log may include additional data related to each of the impressions, e.g., length of impression, percentage of content displayed, etc.

The impressions may be provided on behalf of a particular content agent system 130, which is running multiple campaigns. In one embodiment, the number of impressions varies between different impressions log segments; for example, the impressions blocker 310 generates impressions log segments that each include a random number of impressions. Each impressions log segment forms the basis of a respective impressions block, as discussed further below. The random number may be a random number within a given range of numbers, e.g., a random number between 10,000 and 50,000. By using a random number of impressions in each segment, the impressions blocks created from impressions log segments each include a random number of impressions. This prevents content agent systems 130 or other participants in the blockchain from discerning a total number of impressions provided by the online system 140 at any point in time. In this embodiment, when the impressions blocker 310 collects the random number of impressions for a given segment, the impressions blocker 310 generates a second random number and collects that number of impressions for a second impressions log segment. In another embodiment, the impressions blocker 310 segments the impressions based on time; each impressions log segment 400 includes impressions received over a random time interval within a range of times, e.g., 5 to 10 minutes.

In some embodiments, the impressions blocker 310 ensures that each impressions log segment 400 has a minimum time granularity, such that at least a minimum length of time has passed between the earliest-delivered impression and the latest-delivered impression in the segment. The impressions blocker 310 may determine that the minimum time granularity is reached before selecting a set of impressions in the log for the impressions log segment 400. If the random number of impressions is met before the minimum time is reached, the impressions blocker 310 may select a larger segment of impressions collected over at least the minimum time, and split the impressions over two or more segments.

In addition to the data shown in the impressions log segment 400, the impressions blocker 310 may identify or generate additional data for the impressions block, such as an identifier of the impressions log segment 400, an identifier of one or more content agent systems 130 to which data in the impressions log segment 400 relates, a start timestamp for the selected segment of impressions (i.e., the time at which the earliest-delivered impression in the impressions log segment 400 was delivered), and a stop timestamp for the selected set of impressions (i.e., the time at which the latest-delivered impression in the impressions log segment 400 was delivered).

FIG. 5 is an example set of impressions block data 500 based on the impressions log segment 400 generated by the impressions blocker 310. The impressions block data 500 includes an impressions list 510, an impressions block ID 530, and an impressions time range 540. The impressions list 510 is based on the data in the impressions log segment 400 shown in FIG. 4. The impressions list 510 includes, for each impression, a hashed user ID 520 of the user to which the impression was provided, and the campaign ID 420 of the campaign associated with the impression. For example, the first impression in the impressions list 510 has hashed user ID 520a and campaign ID 420a. The impressions list 510 includes data for the same N impressions as the impressions log segment 400.

The hashed user ID 520 is a pseudo-random string that that distinctly identifies a user to a particular content agent system 130. Both the online system 140 and the content agent systems 130 may have respective identifiers for referring to a user. The online system 140 may use the user IDs 410 to refer to users within its own system, but not to other systems (e.g., content agent systems 130). To identify a user to a particular content agent system 130, the impressions blocker 310 retrieves a user ID for the content agent system 130 and hashes the retrieved user ID using a hash function shared with the content agent system 130. The content agent system 130 can identify the user from the hashed user ID 520.

A user ID used by a content agent system 130 may include identifying information of a user (e.g., the user's name or email address). Hashing the user ID obfuscates the user information, so that the user can only be discerned by an authorized recipient. By using hashed user IDs 520, rather than the user IDs 410, a content agent system 130 that accesses an impressions list 510 that includes impressions for multiple content agent systems can identify receiving users of impressions from its own campaigns (e.g., using its own hash function), while the hashed user IDs hashed using hash functions of other content agent systems 130 obfuscates the identities of the receiving users of impressions from other content agent systems' campaigns. Thus, impressions for multiple content agent systems may be included in the same impressions block.

In some embodiments, content publishers 150 also have unique hashed user IDs 520. In such embodiments, each user—content agent system 130—content publisher 150 triple is assigned a unique pseudo-random string. For example, each content publisher 150 can use a different hash function for hashing user IDs of a particular content agent system 130. The content publishers 150 can provide their unique hashed user IDs in impressions logs provided to the online system 140. Alternatively, if content publishers 150 add their impression data to the blockchain, the content publishers use their own hashed user IDs in the impressions blocks they publish.

A user who has multiple impressions in the impressions log 400 has multiple entries in the impressions list 510, one entry for each impression that the user received. Thus, the same hashed user ID 520 may appear multiple times in the impressions list 510. Each instance of the hashed user ID may be associated with the same campaign ID (e.g., if the user received multiple impressions from the same campaign) or with different campaign IDs (e.g., if the user received impressions from two different campaigns).

The impressions block ID 530 is an identifier of the impressions block data 500. In some embodiments, each impressions block that is added to the blockchain has a unique impressions block ID. In other embodiments, e.g., if an impressions list 510 is too large to add as a single block on the blockchain, the impressions blocker 310 may break an impressions block 500 into multiple sub-blocks that are individually added to the blockchain. In such embodiments, each sub-block has the same impressions block ID 530, and each sub-block may be encrypted using the same unique cypher.

The impressions time range 540 indicates a range of time over which the impressions in the impressions list 510 were delivered. For example, if the impression with timestamp 430a was the earliest delivered impression in the impressions log 400, and the impression with timestamp 430N was the last delivered impression in the impressions log 400, the impressions time range 540 is the span of time from timestamp 430a to timestamp 430N.

The impressions blocker 310 may include additional or different information in a set of impressions block data. For example, in some embodiments, the impressions blocker 310 includes an identifier of one or more content agent systems 130 that have impressions in the impressions list 510, an identifier of one or more content publishers 150 that delivered the impressions, or other information of interest to the content agent systems 130 or matching agent systems 160.

After selecting the set of impressions and compiling the data for the impressions block, the impressions blocker 310 generates the impressions block by encrypting the impression data describing the selected set of impressions using a unique cypher. For example, the impressions blocker 310 encrypts the impressions list 510 with the cypher, and may optionally encrypt the impressions time range 540 or any other information included in the impressions block data 500. The cypher is a one-time cypher that is unique to the impressions block (or set of sub-blocks, as mentioned above). The impressions blocker 310 may generate the unique cypher using a random or pseudorandom key generator. The impressions blocker 310 adds the encrypted impressions block to a blockchain, as described with respect to FIG. 8.

The cypher blocker 315 generates data for cypher blocks, each of which provides one of the unique cyphers (e.g., for the various impressions blocks) for accessing encrypted data in the corresponding impressions blocks. For each content agent system 130 or matching agent system 160 (both referred to generally as an "agent") that is authorized to view unencrypted data in an impressions block, the cypher blocker 315 accesses the agent's public key from the data store of agent public keys 320, and generates an encrypted cypher block using the agent's public key.

Figure 6:
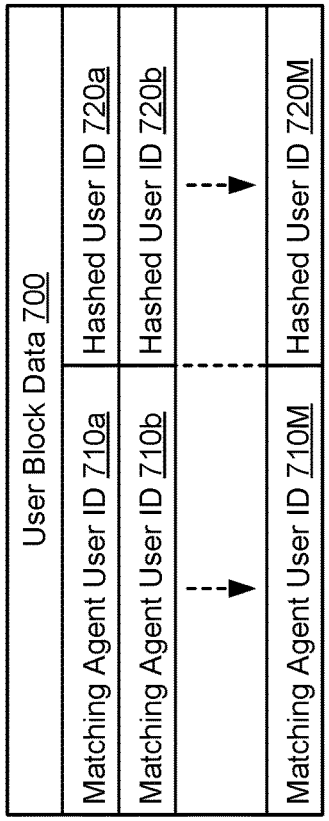
FIG. 6 is an example set of cypher block data, in accordance with an embodiment.

FIG. 6 is an example set of cypher block data 600 that is used to access the impressions block that includes the impressions block data 500 shown in FIG. 5. The cypher block data 600 includes the impressions block ID 530 of the impressions block data 500, the cypher 610 that was used to encrypt some or all of the impressions block data 500, and a checksum 620. The checksum 620 is used to verify that the decrypted message is valid for the receiving agent. As shown in FIG. 6, the impressions block ID 530 and cypher 610 are included in a single main data block 630, and the checksum 620 is in its own, smaller data block. The cypher blocker 315 encrypts the main data block 630 and the checksum 620 with the public key of each agent. Thus, the agent with the private key can recover the cypher block data 600, including the cypher 610, and other agents or participants in the blockchain that do not have the private key cannot recover the cypher block data 600. In some embodiments, the agent with the private key attempts to decrypt the checksum 620, and if agent is successful, the agent decrypts the main data block 630. This is more efficient than if the agent were to directly attempt to decrypt each main data block 630, because the main data block 630 is larger than the checksum 620.

Unlike a multi-party encryption scheme in which all parties can access the cypher, this structure obfuscates how many agents are a party to a specific impressions block. Each agent accesses a different cypher block corresponding to the impressions block, and the impressions block ID 530 is encrypted by the public key so that only the authorized recipient of the cypher block can determine the impressions block ID 530 to which the cypher block corresponds. In addition, this scheme allows multiple agents to access impressions data that is published only once. For example, new agents can retroactively be granted access to an impressions block by simply adding a cypher block for the new agent to the blockchain, rather than by adding the impressions block and the cypher block.

The user blocker 325 generates user block data that allow matching agents 160 to determine which user hashes 520 are associated with which users, and then match impression data describing impressions delivered by multiple content publishers 150 to the same users. This allows matching agents 160 to perform analysis across multiple content publishers 150. In some embodiments, matching agents 160 may also perform analysis across impressions provided for multiple content agent systems 130. The user blocker 325 associates user hashes with a corresponding user identifier of a matching agent. The user blocker 325 encrypts the user block data with the public key of the matching agent 160 so that the matching agent 150 can uncover the user data using the matching agent's corresponding private key. The matching agent 160 has access to the private key, and other agents do not. The user blocker 325 may retrieve the public key of the matching agent 150 from the data store of agent pubic keys 320.

Figure 7:
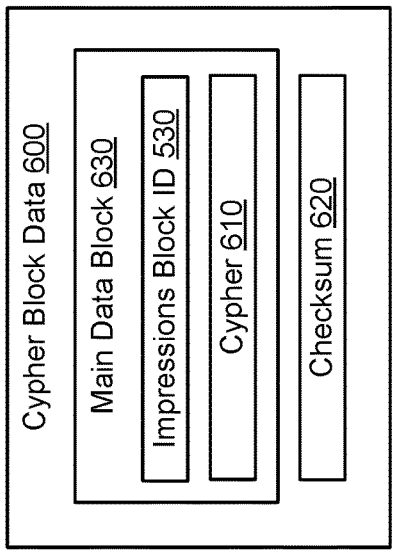
FIG. 7 is an example set of user block data, in accordance with an embodiment.

FIG. 7 is an example set of user block data 700. The user block data 700 includes a list of matching agent user IDs 710 and corresponding hashed user IDs 720. Each hashed user ID 720 is associated with a user, a content publisher 150, and a content agent system 130. The matching agent user ID 710 may be a user ID particular to the matching agent system 160 that is also known to the online system 140. Alternatively, the matching agent user ID 710 may be any information that can be used to uniquely identify a user, including one or more of email address, name, birthday, phone number, social security number, etc.

The impressions block data, cypher block data, and user block data are all published to a blockchain. The blockchain subsystem 230 includes a copy of the blockchain 330. The blockchain 330 stores blocks published by the blockchain subsystem 230. The blockchain subsystem 230 may also receive impressions blocks, cypher blocks, and user blocks published by other systems, such as blocks published by other content providers 150 or other online systems; the blockchain subsystem 230 also stores these blocks on its copy of the blockchain 330. In some embodiments, multiple blockchains or branches of blockchains are created by the blockchain system 230 and/or other participants of the blockchain(s). For example, subsets of content publishers 150 or subsets of content agent systems 130 may participate in different blockchains.

Figure 8:
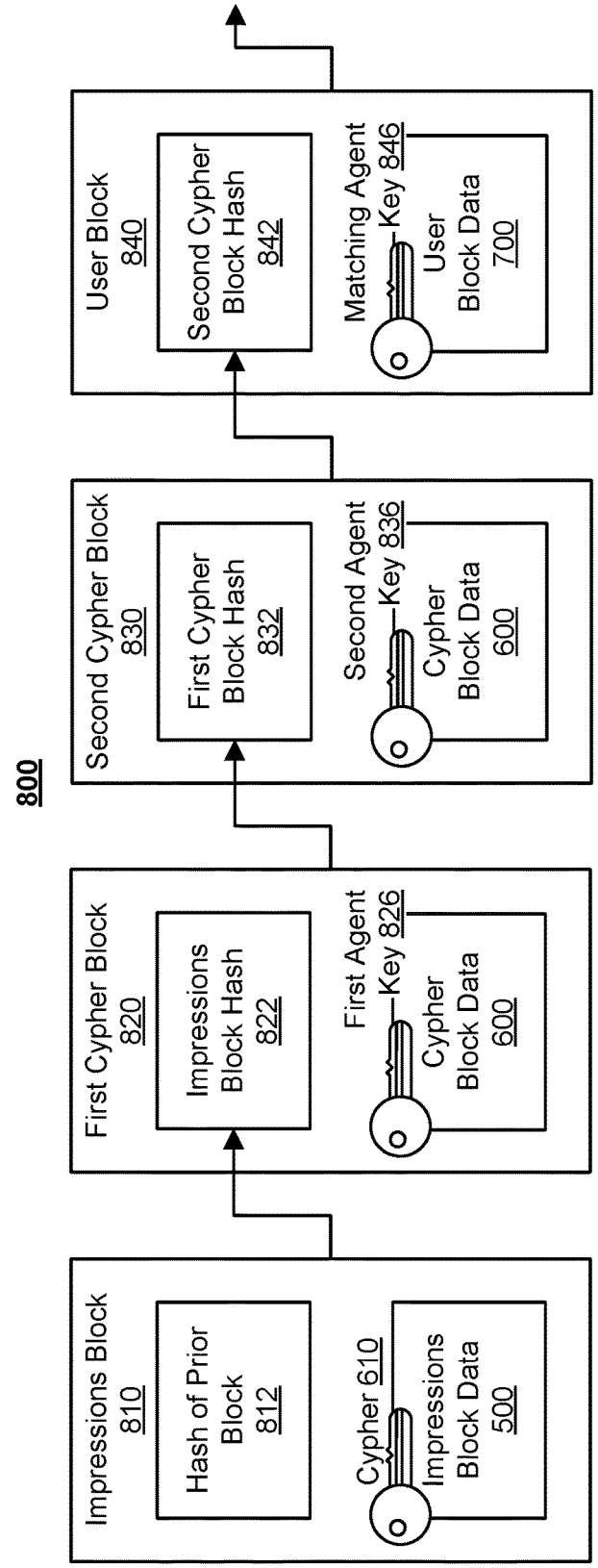
FIG. 8 is an example portion of a blockchain that includes an impressions block, two cypher blocks, and a user block, in accordance with an embodiment.

FIG. 8 is an example portion of a blockchain 800 that includes an impressions block, two cypher blocks, and a user block. The blockchain 800 shows an example of how the blockchain subsystem 230 (e.g., the impressions blocker 310, cypher blocker 315, and user blocker 325) adds the impressions block data 500, cypher block data 600, and user block data 700 shown in FIGS. 5-7 to the blockchain 800. In general, each block in a blockchain is formed by combining a hash of the previous block in the blockchain with the transaction data for the block being added. The block may further include a timestamp that the block is added to the blockchain; timestamps are not shown in FIG. 8, but they may be included in the blocks.

The first block in the example portion of the blockchain 800 is an impressions block 810. The impressions block 810 includes a hash 812 of a prior block (not shown in FIG. 8), and the impressions block data 500, shown in FIG. 5. The impressions blocker 310 encrypts the impressions block data 500 with a cypher 610, as indicated by the key above the impressions block data 500. The impressions block ID 530 may be encrypted separately from other data in the impressions block data 500 so that an agent can identify the impressions block 500 before attempting to decrypt the other data (e.g., the impressions list 510 and the impressions time range 540).

The following block in the example portion of the blockchain 800 is a first cypher block 820. The first cypher block 820 includes a hash 822 of the impressions block 810 and the cypher block data 600, shown in FIG. 6. The cypher block data 600 includes the cypher 610 that was used to encrypt the impressions block data 500, along with the ID of the impressions block and a checksum. The cypher blocker 315 encrypts the cypher block data 600 with a first agent's public key 826. This allows the first agent (e.g., one of the content agent systems 130) to decrypt the cypher block data 600 using its corresponding private key, recover the cypher 610, and access the impressions block data 500. As noted above, the main data block 630 and checksum 620 may be encrypted separately, so that the first agent can first confirm that it can decrypt the checksum 620 before decrypting the main data block 630.

The next block in the example portion of the blockchain 800 is a second cypher block 830. The second cypher block 830 includes a hash 832 of the first cypher block 820 and the cypher block data 600. The cypher blocker 315 encrypts the cypher block data 600 with a second agent's public key 836. This allows the second agent (e.g., another one of the content agent systems 130, or one of the matching agents 150) to decrypt the cypher block data 600 using its corresponding private key, recover the cypher 610, and access the impressions block data 500.

The final block in the example portion of the blockchain 800 is a user block 840. The user block 840 includes a hash of the second cypher block 832 and the user block data 700. The user blocker 325 encrypts the user block data 700 with a matching agent's public key 846. This allows the matching agent 150 to decrypt the user block data 700 using its corresponding private key. If the matching agent 150 also has access to one or more cypher blocks (e.g., the second cypher block 830), the matching agent 150 can also recover the cypher 610 and access the impressions block data 500. The matching agent 150 can then associate hashed user IDs in the recovered impression data with the corresponding user identifiers of the matching agent based on the data in the user block.

A block added to the blockchain 800 after the user block 840 includes a hash of the user block 840. The blocks on shown in the example portion of the blockchain 800 is are merely exemplary. For example, the blocks may be added in any order, e.g., a cypher block can be added before a corresponding impressions block.

Figure 9:
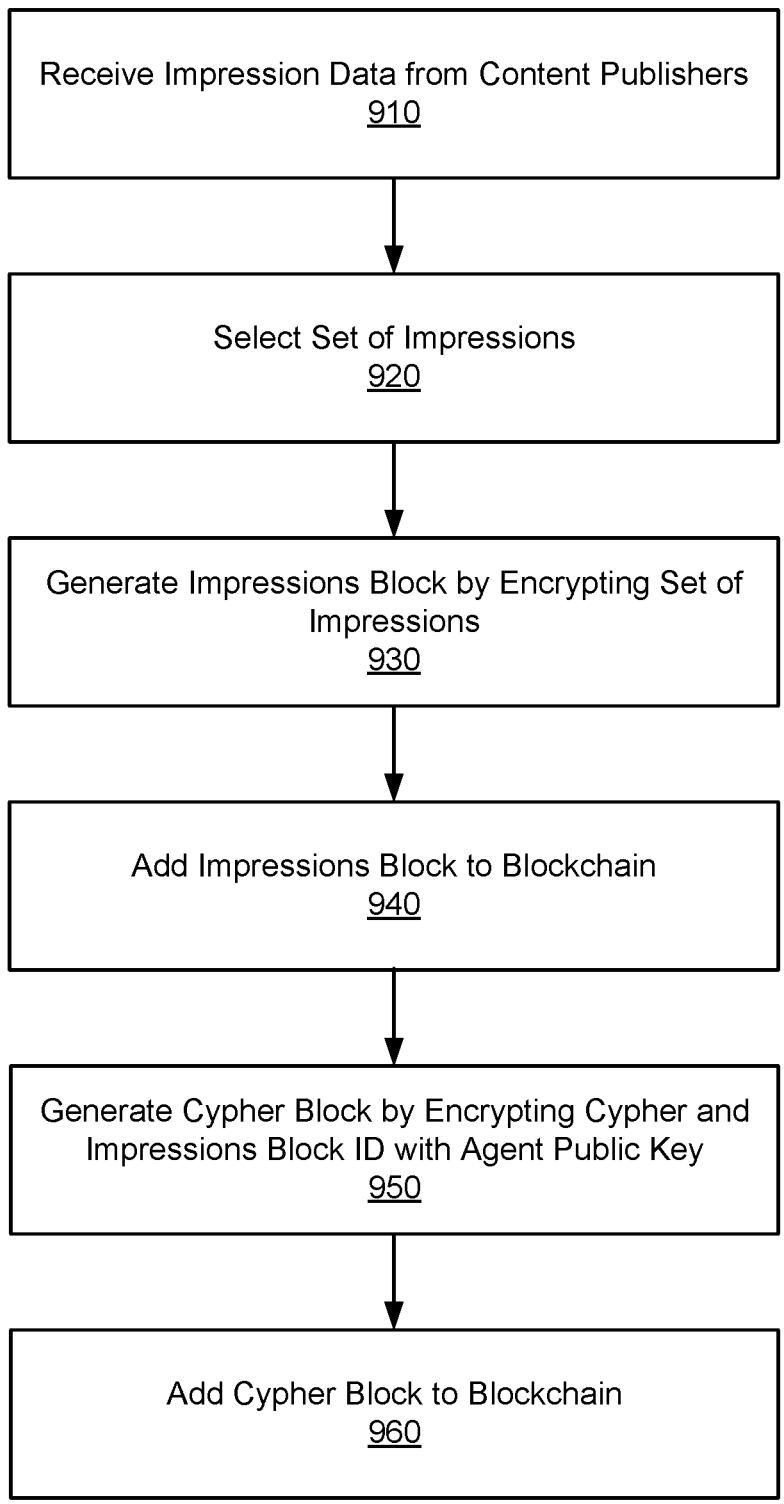
FIG. 9 is a flow chart showing a method of adding blocks that can be used to selectively view impression data to a blockchain, in accordance with an embodiment.

FIG. 9 is a flow chart showing a method 900 of adding blocks that can be used to selectively view impression data to a blockchain, in accordance with an embodiment. In other embodiments, the process may include different and/or additional steps than those shown in FIG. 9. Additionally, steps of the method 900 may be performed in different orders than the order described in conjunction with FIG. 9 in various embodiments.

The blockchain subsystem 230 receives 910 impression data from one or more content publishers 910. The content publisher may be the online system 140 or one or more external content publishers 150. For example, the impressions logger 305 may log the received impressions in an impressions log.

The impressions blocker 310 selects 920 a set of impressions. For example, the impressions blocker 310 may select the impressions in one impressions log, or select some portion of an impressions log. The impressions blocker 310 may determine a random number, and select the random number of impressions from a contiguous time period. The impressions blocker 310 may also check that the time period over which the impressions were delivered extends over at least a minimum time period; if not, the impressions blocker 310 may select a larger set of impressions that extends for the minimum time period, and break this set into multiple blocks.

The impressions blocker 310 generates 930 an impressions block by encrypting data describing the selected set of impressions. As shown in the example in FIG. 5, the impressions blocker 310 may also generate an impressions list from the impression data that refers to users using hashed user IDs. The impressions blocker 310 may also include additional data in the impressions block, e.g., an impressions block ID and a time range for the impressions included in the impressions block. The impressions blocker 310 encrypts some or all of this aggregated data.

The impressions blocker 310 adds 940 the impressions block to the blockchain. As shown in FIG. 8, the impressions blocker 310 hashes the previous block on the blockchain, combines this with the encrypted impression data, and publishes the new block to the blockchain.

The cypher blocker 315 generates 950 a cypher block by encrypting the cypher used to encrypt the impressions block, and the impressions block ID of the impressions block, with a public key of an agent.

The cypher blocker 315 adds 960 the cypher block to the blockchain. As shown in FIG. 8, the cypher blocker 315 hashes the previous block on the blockchain, combines this with the encrypted cypher data, and publishes the new block to the blockchain.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method performed by one or more processors, comprising:
    receiving impression data from one or more content publishers, the received impression data describing impressions provided to users of an online system on behalf of an agent;
    selecting a set of impressions from the received impression data, the selected set of impressions comprising a randomly selected number of impressions in the received impression data;
    generating an impressions block by encrypting impression data describing the selected set of impressions using a unique cypher;
    adding the impressions block to a blockchain;
    generating a cypher block by encrypting the unique cypher and an identifier of the impressions block using a public key of the agent previously provided by the agent to the online system; and
    adding the cypher block to the blockchain;
    wherein the agent can recover the unique cypher from the cypher block based on a private key corresponding to the public key, and the agent can recover the impression data describing the selected set of impressions using the recovered unique cypher.

2. The method of claim 1, further comprising:
generating a second cypher block by encrypting the unique cypher and the identifier of the impressions block using a second public key of a second agent; and
adding the second cypher block to the blockchain;
wherein the second agent can recover the unique cypher from the second cypher block based on a second private key corresponding to the second public key, and the second agent can recover the impression data describing the selected set of impressions using the recovered unique cypher.

3. The method of claim 1, wherein the impressions block further comprises an identifier of the impressions block, and identifier of the agent, a start timestamp of the selected set of impressions, and a stop timestamp of the selected set of impressions.

4. The method of claim 1, further comprising:
receiving, by the online system, a second impressions block provided by content publisher; and
storing the second impressions block on a copy of the blockchain maintained by the online system.

5. The method of claim 1, wherein the selecting the set of impressions from the received impression data comprises:
collecting a log of impressions, each impression of the log of impressions comprising a timestamp;
generating the randomly selected number; and
in response to determining that a number of impressions in the log equals the randomly selected number and that timestamps of the impressions in the log cover at least a minimum range of time, selecting the impressions in the log of impressions as the set of impressions.

6. The method of claim 1, wherein an impression comprises provision of a content item to a user of a plurality of users of the online system, the content item provided to the online system by an agent of a plurality of agents, and the impression data describing the selected set of impressions comprises, for each impression, an identifier of the user to whom the content item was provided.

7. The method of claim 6, wherein the identifier of the user is a hashed user identifier that identifies the user to the agent of the plurality of agents who provided the content item and obfuscates the identifier of the user to at least one other agent of the plurality of agents.

8. The method of claim 7, further comprising generating a user block that associates the hashed user identifier with a corresponding user identifier of a matching agent that does not provide content items to the online system, the user block encrypted by a matching agent public key provided to the online system by the matching agent.

9. The method of claim 8, further comprising:
generating a second cypher block by encrypting the unique cypher and the identifier of the impressions block using a matching agent public key; and
adding the second cypher block to the blockchain;
wherein the matching agent can recover the unique cypher from the second cypher block based on a private key corresponding to the matching agent public key, recover the impression data describing the selected set of impressions using the recovered unique cypher, and associate a hashed user identifier in the recovered impression data with the corresponding user identifier of the matching agent based on the user block.

10. A computer program product for publishing selectively viewable impression data to a blockchain, the computer program product comprising a non-transitory computer-readable storage medium containing computer program code for:

receiving impression data from one or more content publishers, the received impression data describing impressions provided to users of an online system on behalf of an agent;
selecting a set of impressions from the received impression data, the selected set of impressions comprising a randomly selected number of impressions in the received impression data;
generating an impressions block by encrypting impression data describing the selected set of impressions using a unique cypher;
adding the impressions block to a blockchain;
generating a cypher block by encrypting the unique cypher and an identifier of the impressions block using a public key of the agent previously provided by the agent to the online system; and
adding the cypher block to the blockchain;
wherein the agent can recover the unique cypher from the cypher block based on a private key corresponding to the public key, and the agent can recover the impression data describing the selected set of impressions using the recovered unique cypher.

11. The computer program product of claim 10, further comprising computer program code for:
generating a second cypher block by encrypting the unique cypher and the identifier of the impressions block using a second public key of a second agent; and
adding the second cypher block to the blockchain;
wherein the second agent can recover the unique cypher from the second cypher block based on a second private key corresponding to the second public key, and the second agent can recover the impression data describing the selected set of impressions using the recovered unique cypher.

12. The computer program product of claim 10, wherein the impressions block further comprises an identifier of the impressions block, and identifier of the agent, a start timestamp of the selected set of impressions, and a stop timestamp of the selected set of impressions.

13. The computer program product of claim 10, further comprising computer program code for:
receiving, by the online system, a second impressions block provided by content publisher; and
storing the second impressions block on a copy of the blockchain maintained by the online system.

14. The computer program product of claim 10, wherein the selecting the set of impressions from the received impression data comprises:
collecting a log of impressions, each impression of the log of impressions comprising a timestamp;
generating the randomly selected number; and
in response to determining that a number of impressions in the log equals the randomly selected number and that timestamps of the impressions in the log cover at least a minimum range of time, selecting the impressions in the log of impressions as the set of impressions.

15. The computer program product of claim 10, wherein an impression comprises provision of a content item to a user of a plurality of users of the online system, the content item provided to the online system by an agent of a plurality of agents, and the impression data describing the selected set of impressions comprises, for each impression, an identifier of the user to whom the content item was provided.

16. The computer program product of claim 15, wherein the identifier of the user is a hashed user identifier that identifies the user to the agent of the plurality of agents who provided the content item and obfuscates the identifier of the user to at least one other agent of the plurality of agents.

17. The computer program product of claim 16, further comprising computer program code for generating a user block that associates the hashed user identifier with a corresponding user identifier of a matching agent that does not provide content items to the online system, the user block encrypted by a matching agent public key provided to the online system by the matching agent.

18. The computer program product of claim 17, further comprising computer program code for:
generating a second cypher block by encrypting the unique cypher and the identifier of the impressions block using a matching agent public key; and
adding the second cypher block to the blockchain;
wherein the matching agent can recover the unique cypher from the second cypher block based on a private key corresponding to the matching agent public key, recover the impression data describing the selected set of impressions using the recovered unique cypher, and associate a hashed user identifier in the recovered impression data with the corresponding user identifier of the matching agent based on the user block.

* * * * *